(12) United States Patent
Chen et al.

(10) Patent No.: US 11,636,613 B2
(45) Date of Patent: Apr. 25, 2023

(54) COMPUTER APPLICATION METHOD AND APPARATUS FOR GENERATING THREE-DIMENSIONAL FACE MODEL, COMPUTER DEVICE, AND STORAGE MEDIUM

(71) Applicant: Tencent Technology (Shenzhen) Company Limited, Shenzhen (CN)

(72) Inventors: Yajing Chen, Shenzhen (CN); Yibing Song, Shenzhen (CN); Yonggen Ling, Shenzhen (CN); Linchao Bao, Shenzhen (CN); Wei Liu, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 86 days.

(21) Appl. No.: 17/337,909

(22) Filed: Jun. 3, 2021

(65) Prior Publication Data

US 2021/0286977 A1    Sep. 16, 2021

Related U.S. Application Data

(63) Continuation of application No. PCT/CN2020/076650, filed on Feb. 25, 2020.

(30) Foreign Application Priority Data

Feb. 26, 2019 (CN) .......... 201910140602.X

(51) Int. Cl.
*G06T 7/73* (2017.01)
*G06T 17/00* (2006.01)
*G06T 7/50* (2017.01)
*G06V 40/16* (2022.01)
(Continued)

(52) U.S. Cl.
CPC .............. *G06T 7/50* (2017.01); *G06F 18/213* (2023.01); *G06F 18/214* (2023.01); *G06T 7/75* (2017.01);
(Continued)

(58) Field of Classification Search
CPC ........... G06T 17/00; G06T 2207/30201; G06T 2207/20081; G06T 2207/20084; G06N 3/08
See application file for complete search history.

(56) References Cited

U.S. PATENT DOCUMENTS

2014/0355843 A1   12/2014   Da et al.

FOREIGN PATENT DOCUMENTS

CN    101303772 A    11/2008
CN    101561874 A    10/2009
(Continued)

OTHER PUBLICATIONS

Yu R, Saito S, Li H, Ceylan D, Li H. Learning dense facial correspondences in unconstrained images. InProceedings of the IEEE International Conference on Computer Vision 2017 (pp. 4723-4732). (Year: 2017).*

(Continued)

*Primary Examiner* — Diane M Wills
(74) *Attorney, Agent, or Firm* — Crowell & Moring LLP

(57) ABSTRACT

A computer application method for generating a three-dimensional (3D) face model is provided, performed by a face model generation model running on a computer device, the method including: obtaining a two-dimensional (2D) face image as input to the face model generation model; extracting global features and local features of the 2D face image; obtaining a 3D face model parameter based on the global features and the local features; and outputting a 3D face model corresponding to the 2D face image based on the 3D face model parameter.

17 Claims, 6 Drawing Sheets

(51) Int. Cl.
  *G06F 18/213* (2023.01)
  *G06F 18/214* (2023.01)
(52) U.S. Cl.
  CPC ............ *G06T 17/00* (2013.01); *G06V 40/169* (2022.01); *G06V 40/171* (2022.01); *G06T 2200/08* (2013.01); *G06T 2207/20084* (2013.01)

(56) References Cited

FOREIGN PATENT DOCUMENTS

| CN | 104574432 A | 4/2015 |
|---|---|---|
| CN | 107680158 A | 2/2018 |
| CN | 109978989 A | 7/2019 |

OTHER PUBLICATIONS

Extended European Search Report for European Patent Application No. 20763064.1 dated Jul. 21, 2022, 12 pages.

Pengfei Dou et al: "End-to-end 3D face reconstruction with deep neural networks", arxiv.org, Cornell University Library, 201 Olin Library Cornell University Ithaca, NY 14853, Apr. 17, 2017 (Apr. 17, 2017), XP080763486, 10 pages.

Jackson Aarons et al: "Large Pose 3D Face Reconstruction from a Single Image via Direct Volumetric CNN Regression", 2017 IEEE International Conference on Computer Vision (ICCV), IEEE, Oct. 22, 2017 (Oct. 22, 2017), pp. 1031-1039, XP033282960.

Feng Yao et al: "Joint 3D Face Reconstruction and Dense Alignment with Position Map Regression Network", Oct. 9, 2018 (Oct. 9, 2018), Advances in Databases and Information Systems; [Lecture Notes in Computer Science; Lect.Notes Computer], Springer International Publishing, CHAM, pp. 557-574, XP047500404.

Liu Feng et al: "Disentangling Features in 3D Face Shapes for Joint Face Reconstruction and Recognition", 2018 IEEE/CVF Conference on Computer Vision and Pattern Recognition, IEEE, Jun. 18, 2018 (Jun. 18, 2018), pp. 5216-5225, XP033473434.

International Search Report and Written Opinion with English Translation for International Application No. PCT/CN2020/076650 dated May 21, 2020, 11 pages.

\* cited by examiner

COMPUTER APPLICATION METHOD AND APPARATUS FOR GENERATING THREE-DIMENSIONAL FACE MODEL, COMPUTER DEVICE, AND STORAGE MEDIUM

RELATED APPLICATION

This application is a continuation application of the International PCT Application No. PCT/CN2020/076650, filed with the China National Intellectual Property Administration, PRC on Feb. 25, 2020 which claims priority to Chinese Patent Application No. 201910140602.X, entitled " " and filed with the China National Intellectual Property Administration, PRC on Feb. 26, 2019, both of which are incorporated herein by reference in their entireties.

FIELD OF THE TECHNOLOGY

The present disclosure relates to the field of computer technologies, and in particular, to a computer application method and apparatus, a computer device, and a storage medium for generating a three-dimensional (3D) face model.

BACKGROUND OF THE DISCLOSURE

With the development of the computer technologies, the technology of generating a 3D face model based on images has been applied to many fields. For example, the technology has been widely applied to fields such as facial recognition, public safety, medical treatment, gaming, filming, and entertainment.

At present, the 3D face model generation method is usually to extract global features of a two-dimensional (2D) face image, and calculate a 3D face model parameter according to the global features, to obtain a 3D face model through calculation according to the 3D face model parameter.

Only the global features of the 2D face image are extracted in the 3D face model generation method. Attention is not paid to face details when the 3D face model is obtained through calculation based on the global features. As a result, the face details in the 2D face image cannot be well restored.

SUMMARY

A computer application method for generating a 3D face model includes:
 obtaining a 2D face image;
 invoking a face model generation model; and
 inputting the 2D face image into the face model generation model, to extract global features and local features of the 2D face image by using the face model generation model, obtain a 3D face model parameter based on the global features and the local features, and output a 3D face model corresponding to the 2D face image based on the 3D face model parameter.

A computer application apparatus for generating a 3D face model includes:
 an obtaining module, configured to obtain a 2D face image;
 an invoking module, configured to invoke a face model generation model; and
 a generation module, configured to input the 2D face image into the face model generation model, to extract global features and local features of the 2D face image by using the face model generation model, obtain a 3D face model parameter based on the global features and the local features, and output a 3D face model corresponding to the 2D face image based on the 3D face model parameter.

A computer device includes a memory and one or more processors, the memory storing computer-readable instructions, the computer-readable instructions, when executed by the one or more processors, causing the one or more processors to perform the following operations:
 obtaining a 2D face image;
 invoking a face model generation model; and
 inputting the 2D face image into the face model generation model, to extract global features and local features of the 2D face image by using the face model generation model, obtain a 3D face model parameter based on the global features and the local features, and output a 3D face model corresponding to the 2D face image based on the 3D face model parameter.

One or more non-transitory computer-readable storage media store computer-readable instructions, the computer-readable instructions, when executed by one or more processors, causing the one or more processors to perform the following operations:
 obtaining a 2D face image;
 invoking a face model generation model; and
 inputting the 2D face image into the face model generation model, to extract global features and local features of the 2D face image by using the face model generation model, obtain a 3D face model parameter based on the global features and the local features, and output a 3D face model corresponding to the 2D face image based on the 3D face model parameter.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from the accompanying drawings without creative efforts.

DESCRIPTION OF EMBODIMENTS

To make the objectives, technical solutions, and advantages of the present disclosure clearer, implementations of the present disclosure are further described below in detail with reference to the accompanying drawings.

Figure 1:
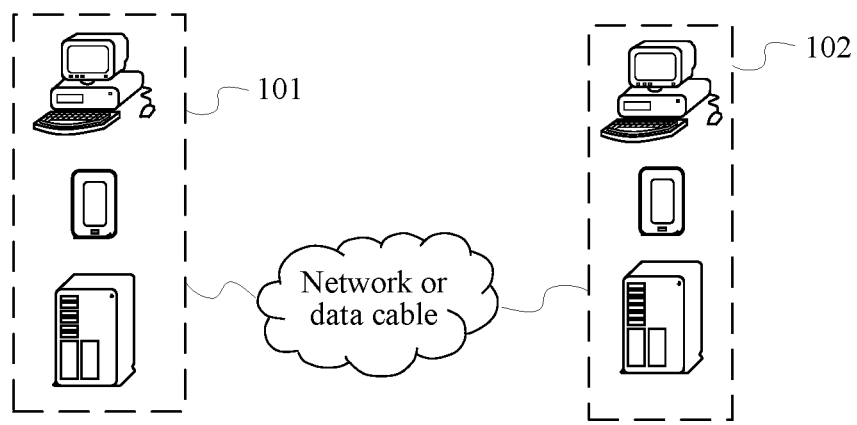
FIG. 1 shows an exemplary implementation environment of a computer application method for generating a 3D face model according to an embodiment of this disclosure.

FIG. 1 shows an implementation environment of a computer application method for generating a 3D face model according to an embodiment of this disclosure. The implementation environment may include at least one computer device. Referring to FIG. 1, description is made by using only an example in which the implementation environment includes a plurality of computer devices. The plurality of computer devices may implement data exchange in a wired connection manner, or may implement data exchange in a wireless network connection manner. This is not limited in this embodiment of this disclosure.

In this embodiment of this disclosure, a computer device 101 may generate a 3D face model based on a 2D face image, to obtain a 3D face model corresponding to the 2D face image. This process is a 3D face reconstruction process. In a possible implementation, the computer device 101 may store a face model generation model. The computer device 101 may process the 2D face image based on the stored face model generation model to implement a 3D face model generation process. In another possible implementation, the computer device 101 may alternatively invoke a face model generation model on another computer device when needing to generate a face model, to perform a process of generating the face model. This is not limited in this embodiment of this disclosure. The following description is made by using an example in which the computer device 101 stores a face model generation model.

In a possible implementation, the face model generation model may be obtained through training on the computer device 101, or may be obtained through training on another computer device. For example, the other computer device may be a computer device 102. The computer device 102 may further transmit the trained face model generation model to the computer device 101 after encapsulating the trained face model generation model, so that the computer device 101 may receive and store the trained face model generation model. The device for training the face model generation model is not limited in this embodiment of this disclosure.

In a possible implementation, the computer device 101 may perform image acquisition to obtain a 2D face image, and invoke the stored face model generation model to process the 2D face image to obtain a 3D face model. In another possible implementation, the computer device 101 may receive a face model generation request transmitted by another computer device. The face model generation request carries a 2D face image. The computer device 101 may perform the foregoing 3D face model generation operation, and transmit a generated 3D face model back to the other computer device. A specific implementation is not limited in this embodiment of this disclosure.

Specifically, both the computer device 101 and the computer device 102 may be configured as terminals, or may be configured as servers. This is not limited in this embodiment of this disclosure.

Figure 2:
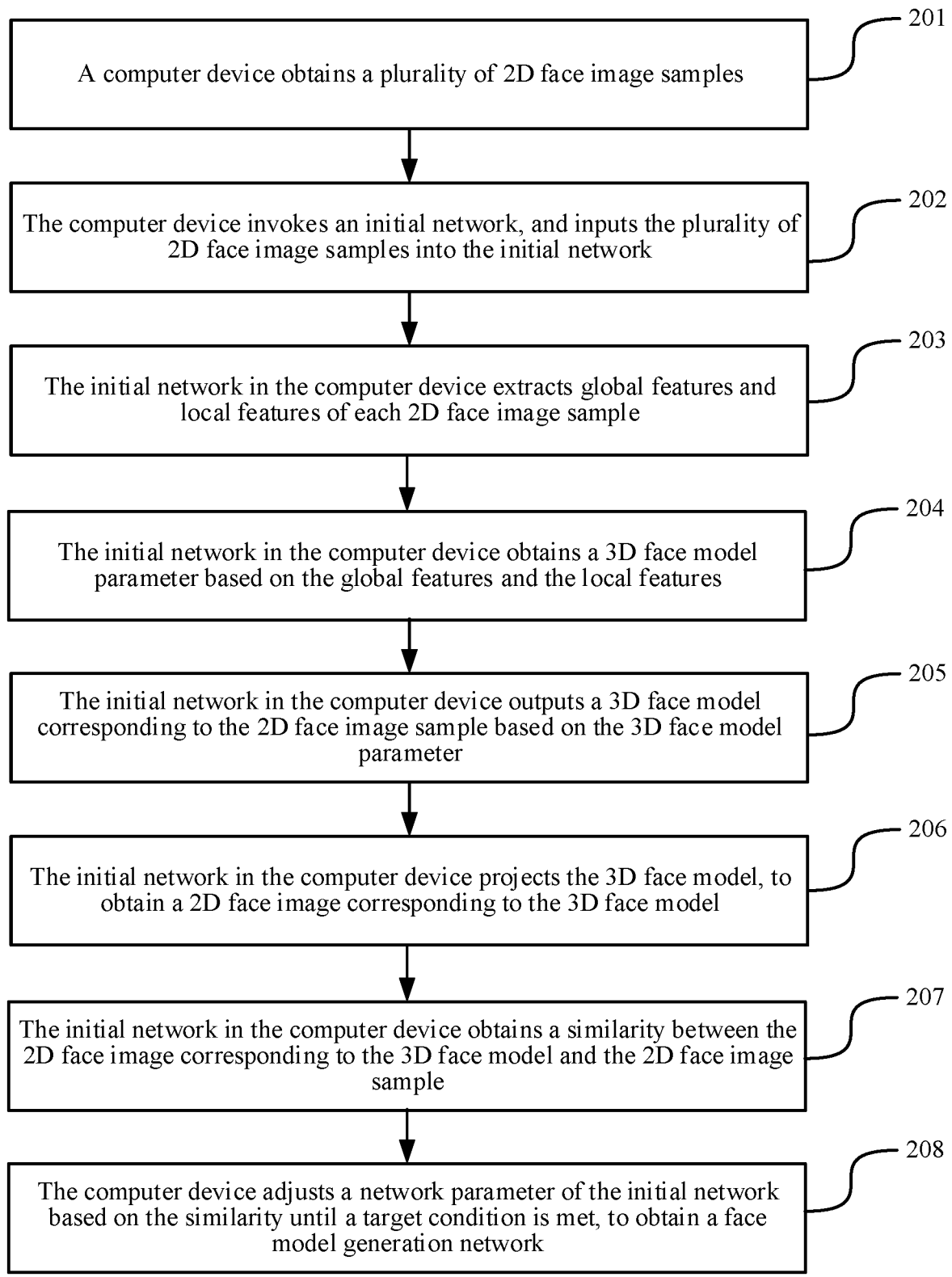
FIG. 2 is a flowchart of an exemplary face model generation model training method according to an embodiment of this disclosure.

FIG. 2 is a flowchart of a face model generation model training method according to an embodiment of this disclosure. The face model generation model training method is applicable to a computer device. The computer device may be the computer device 101, or may be the computer device 102. This is not limited in this embodiment of this disclosure. The computer device may be a terminal, or may be a server. This is not limited in this embodiment of this disclosure. Referring to FIG. 2, the face model generation model training method may include the following steps:

201: The computer device obtains a plurality of 2D face image samples.

In this embodiment of this disclosure, the computer device may train an initial model based on the 2D face image samples, to obtain a face model generation model, so that a 3D face model can be generated subsequently based on the trained face model generation model.

In a possible implementation, the plurality of 2D face image samples may be stored in the computer device. When training the face model generation model, the computer device may obtain the plurality of 2D face image samples from a local storage. In another possible implementation, the plurality of 2D face image samples may alternatively be stored in another computer device. When needing to train the face model generation model, the computer device obtains the plurality of 2D face image samples from the another computer device. For example, the computer device may obtain a plurality of 2D face images as image samples from an image database. A manner of obtaining the 2D face image samples is not limited in this embodiment of this disclosure.

The process of training the face model generation model may be performed in a manner of unsupervised learning. The computer device may obtain a plurality of 2D face image samples, and complete the model training process based on the 2D face image samples. The 2D face image samples may not need to carry tag information. The tag information is generally an artificially synthesized 3D face model parameter, which is pseudo-real data.

202: The computer device invokes an initial model, and inputs the plurality of 2D face image samples into the initial model.

After obtaining the 2D face image samples, the computer device may train the initial model based on the 2D face image samples. Therefore, the computer device may invoke the initial model and input the 2D face image samples into the initial model. A model parameter in the initial model has an initial value. The computer device may adjust the model parameter of the initial model according to the training process performed by the initial model on the 2D face image samples, so that the adjusted initial model can obtain, based on a 2D face image, a 3D face model that is more similar to the 2D face image and has better face details.

The initial model may be stored in the computer device, or may be stored in another computer device and the computer device obtains the initial model from the other computer device. This is not limited in this embodiment of this disclosure.

203: The initial model in the computer device extracts global features and local features of each 2D face image sample.

After the computer device inputs the plurality of 2D face image samples into the initial model, the initial model may process the plurality of inputted 2D face image samples. Specifically, the initial model may perform a 3D face model generation operation based on each 2D face image sample to obtain the 3D face model.

In the 3D face model generation operation, the initial model may first extract features of each 2D face image sample, and generate a 3D face model based on the features of the 2D face image sample, so that the 3D face model obtained in this way may preserve the same feature as the 2D face image sample, which are more similar to each other.

Specifically, the initial model may obtain global features and local features of the 2D face image sample. The global features are all features obtained by performing feature extraction on the 2D face image sample as a whole. The local features are features obtained by performing feature extraction on local regions of the 2D face image sample. For example, the global features may reflect all regions of the 2D face image sample. The local features may reflect the local regions of the 2D face image sample, for example, the five sense organs of a face in the 2D face image sample. In another example, the local regions may be the eyes and nose, or the eyes and mouth, or may be other regions. This is not limited in this embodiment of this disclosure. In the feature extraction process, both the global features and the local features are considered. In this way, the face details can be further optimized while an overall grasp of the 2D face image samples is achieved, so that the 3D face model obtained by the computer device by integrating the global features and the local features has a better effect.

The process of extracting the global features and the local features of each 2D face image sample is described below in detail, which can be specifically implemented in the following step 1 to step 3:

Step 1: The computer device may perform feature extraction on the 2D face image sample based on a plurality of convolutional layers, to obtain the global features of the 2D face image sample.

The computer device may convolve the 2D face image sample a plurality of times, to extract the global features of the 2D face image sample. In a possible embodiment, the initial model may use a visual geometry group-face (VGG-Face) network. The initial model may perform feature extraction on the 2D face image sample by using a plurality of convolutional layers in the VGG-Face network. In another possible embodiment, the initial model may alternatively be implemented by using another facial recognition network, for example, FaceNet, which is a facial recognition network. A specific facial recognition network used by the initial model is not limited in this embodiment of this disclosure.

In a possible implementation, step 1 may be performed by using an encoder, and the global features may be expressed in a form of a global feature vector. Step 1 may be as follows: The computer device may encode the 2D face image sample based on a plurality of convolutional layers of the encoder, to obtain global feature vectors of the 2D face image sample.

Further, the global features may alternatively be in a form of a feature map, for example, may be in a form of a matrix, or certainly, may be in another form such as an array. This is not limited in this embodiment of this disclosure. For example, a convolutional layer may process the 2D face image sample to obtain a feature map, and input the feature map into a next convolutional layer. The next convolutional layer continues to process the inputted feature map to obtain a feature map.

Step 2: The computer device obtains a central position of a landmark of the 2D face image sample.

In step 2, the computer device may perform landmark detection on the 2D face image sample to obtain a position of a landmark of the 2D face image sample. The landmark may be the five sense organs, a facial contour, or other parts of a face. For example, the face may include 68 landmarks. The computer device may obtain a central position of the landmark based on the obtained position of the landmark. For example, after obtaining positions of the 68 landmarks, the computer device may calculate central positions of the 68 landmarks. The process of performing landmark detection by the computer device may be implemented by using any landmark detection technology. This is not limited in this embodiment of this disclosure.

Step 3: The computer device extracts, based on the central position, partial features as the local features of the 2D face image sample from features obtained by at least one target convolutional layer in the plurality of convolutional layers.

Step 2 and step 3 are a process in which the computer device obtains the local features of the 2D face image sample. In this process, the computer device first extracts partial features from all features of the 2D face image sample based on the central positions of the landmarks of the face to obtain local features of the five sense organs or the facial contour of the face, or the like, so that when a 3D face model is subsequently generated, the five sense organs or a facial contour of a face in the generated 3D face model can be processed more refined based on the obtained local features.

In a possible implementation, in step 1, each convolutional layer may process the 2D face image sample to obtain a feature map, and input the feature map into a next convolutional layer. The next convolutional layer continues to process the inputted feature map to obtain a feature map. When obtaining the local features, the computer device may extract partial features from one or more feature map obtained by one or more of the plurality of convolutional layers. The one or more convolutional layers may each be referred to as a target convolutional layer. For example, if the initial model uses the VGG-Face network, the at least one target convolutional layer may be a convolutional layer con2_2 and a convolutional layer con3_3. The target convolutional layers may be set or adjusted by related technical personnel. This is not limited in this embodiment of this disclosure. In this way, partial features are extracted from features obtained by different convolutional layers. The obtained local features include underlying information and high-level information of the face. The local features are more diversified. The face details finally reflected in the 3D face model are more refined.

Specifically, different target convolutional layers may correspond to different target sizes. The computer device snips, from a feature map obtained by each target convolutional layer, a feature map of a target size corresponding to the target convolutional layer as the local features of the 2D face image sample by using the central position as a center. For example, the computer device snips a 64×64 (e.g., pixels) feature map from a feature map obtained by con2_2 and snips a 32×32 feature map from a feature map obtained by con3_3 by using the central position as a center. The 64×64 feature map and the 32×32 feature map may reflect features corresponding to the five sense organs, the facial contour, or other parts of the face in the 2D face image sample. In the process of obtaining the local features, the target convolutional layer may be considered as a convolutional layer in a local encoder. The local features are obtained based on the local encoder.

In a possible implementation, step 1 may be performed by using an encoder. The global features may be expressed in a form of a global feature vector. In step 3, the local features may be extracted from a target convolutional layer in the encoder. The local features may be expressed in a form of a local feature vector. Step 3 may be as follows: The computer device extracts a part of feature values from a global feature vector obtained by at least one target convolutional layer in a plurality of convolutional layers of the encoder, and obtains a first local feature vector of the 2D face image based on the part of feature values. Correspondingly, in step 204, a process of calculating a 3D face model parameter may be implemented based on a first decoder. For details, reference may be made to step 204. Details are not described in this embodiment of this disclosure.

In a specific possible embodiment, the vector including the part of feature values extracted from the global feature vector has a different form compared with the global feature vectors obtained by the plurality of convolutional layers in step 1. Because a 3D face model parameter needs to be calculated subsequently based on the global feature vector and the local feature vector, after extracting the part of feature values, the computer device may further process the part of feature values based on a second decoder, so that the obtained local feature vector and the global feature vector are in the same form, making it easier to fuse to calculate the 3D face model parameter.

In this embodiment, the process of obtaining the first local feature vector of the 2D face image by the computer device based on the part of feature values may be implemented based on the second decoder, and the process of obtaining the local features may be as follows: The computer device extracts a part of feature values from the global feature vector obtained by the at least one target convolutional layer. The computer device decodes the extracted part of feature values based on the second decoder, to obtain the first local feature vector of the 2D face image. The first local feature vector is subsequently combined with the global feature vector to obtain the 3D face model parameter.

In a possible implementation, a face may include a plurality of parts on different regions, for example, eyes, a nose, and a mouth. When extracting partial features of the global features, the computer device may obtain partial features corresponding to a plurality of regions, and then may integrate the partial features corresponding to the plurality of regions, to obtain the local features of the 2D face image sample. Partial features obtained from each different target convolutional layers may include partial features corresponding to the plurality of regions. If extraction of partial features is performed on a plurality of target convolutional layers, the computer device also needs to integrate partial features corresponding to the plurality of target convolutional layers.

In this implementation, the computer device may extract feature values corresponding to a plurality of regions in the global feature vector in each target convolutional layer, and decode the extracted feature values based on the second decoder, to obtain first local feature vectors of the plurality of regions. Each region corresponds to, for example, an organ part of the face, or a landmark region as described above. The computer device may splice the first local feature vectors of the plurality of regions to obtain the first local feature vector of the 2D face image.

For example, the target convolutional layers are con2_2 and con3_3, and the plurality of regions are a left eye, a right eye, and a mouth. The computer device may obtain features of the left eye, the right eye, and the mouth in con2_2, and obtain features of the left eye, the right eye, and the mouth in con3_3. That is, the computer device obtains local features of the plurality of regions in a plurality of layers. In a specific example, local features of each region in each layer may correspond to a second decoder. The computer device may decode the local features extracted from each region in each layer to obtain a first local feature vector corresponding to each region in each layer. The computer device may splice a plurality of first local feature vectors corresponding to the plurality of regions to obtain the first local feature vector of the 2D face image.

204: The initial model in the computer device obtains a 3D face model parameter based on the global features and the local features.

For each 2D face image sample, after obtaining the global features and the local features, the initial model may integrate the global features and the local features to calculate a 3D face model parameter. In a possible implementation, the 3D face model parameter may be a parameter of a 3D morphable model (3DMM).

In a possible implementation, the initial model obtains the global features and the local features based on the encoder. In step 204, the initial model may decode the global features and the local features based on the first decoder to obtain the 3D face model parameter. It may be learned in step 203 that the global features may be the global feature vector obtained through encoding, and the local features may be the first local feature vector obtained through encoding and decoding. In step 204, the computer device may decode the global feature vector and the first local feature vector based on the first decoder to obtain the 3D face model parameter.

In one embodiment, the first decoder may include a fully connected layer. The computer device may perform calculation on the global feature vector and the first local feature vector based on the fully connected layer to obtain the 3D face model parameter.

The 3D face model parameter may include face information such as texture information, expression information, and shape information of the face. The 3D face model parameter may further include other face information, for example, posture information. This is not limited in this embodiment of this disclosure. The texture, the expression, and the shape of the face may be learned based on the 3D face model parameter. Therefore, the computer device may proceed with step 205, that is, process the 3D face model parameter, to obtain a 3D face model.

205: The initial model in the computer device outputs a 3D face model corresponding to the 2D face image sample based on the 3D face model parameter.

The 3D face model parameter includes a plurality of pieces of face information. The initial model may generate a 3D face model according to the plurality of pieces of face information, so that face information of the generated 3D face model is the same as or is based on the face information indicated by the 3D face model parameter. For example, texture information of the 3D face model is the same as the texture information included in the 3D face model parameter. An expression of a face in the 3D face model is the same as an expression corresponding to the expression information included in the 3D face model parameter. Similarly, shapes of the faces are the same, which is not described in detail herein.

In a possible implementation, the 3D face model may be a combination of a plurality of face models. The computer device may obtain a 3D face model according to the 3D face model parameter and a plurality of initial face models. Specifically, the computer device may calculate coefficients of the plurality of face models according to the 3D face model parameter, to perform calculation using the plurality of initial face models and the corresponding coefficients to obtain the plurality of face models, and splice the plurality of face models to obtain the 3D face model.

In another possible implementation, the 3D face model may be determined based on an average face model and the 3D face model parameter. The computer device may obtain coefficients of a plurality of principal component parts based on the 3D face model parameter, use the coefficients as weights of the principal component parts, and perform weighted summation on the plurality of principal component parts to sum the average face model and the weighted summation result, to obtain the final 3D face model. Each principal component part may be a shape of a face, or may be a texture or the like. This is not limited in this embodiment of this disclosure. The process of generating the 3D face model based on the 3D face model parameter may alternatively be implemented in another manner. The specific implementation is not limited in this embodiment of this disclosure.

Step 202 to step 205 are a process in which the initial model is invoked, the plurality of 2D face image samples are inputted into the initial model, and the initial model extracts the global features and the local features of each 2D face image sample; obtains the 3D face model parameter based on the global features and the local features; and outputs the 3D face model corresponding to the 2D face image sample based on the 3D face model parameter. The initial model processes each 2D face image sample, to obtain a corresponding 3D face model.

206: The initial model in the computer device projects the 3D face model, to obtain a 2D face image corresponding to the 3D face model.

After generating the 3D face model, the initial model may determine a similarity between the 3D face model and the inputted 2D face image sample, to determine whether an effect of this face model generation is good or bad to measure a face model generation function of the initial model. When the face model generation function of the initial model is not good, the model parameter of the initial model may be adjusted until the face model generation function of the adjusted initial model meets a condition. That is, the model training process is completed.

When determining the similarity between the 3D face model and the 2D face image sample, the initial model may render the 3D face model into a 2D face image, and then determine a similarity between the 2D face image obtained through rendering and the inputted 2D face image sample through comparison. The rendering process may be as follows: The initial model obtains shooting information of the 2D face image sample based on the global features, the shooting information being used for indicating at least one of a shooting posture, lighting condition, or a shooting background during shooting of the 2D face image sample; and the initial model projects the 3D face model based on the shooting information, to obtain the 2D face image corresponding to the 3D face model.

Content represented by the shooting information needs to be obtained from the entire 2D face image sample. Thus, the initial model may obtain the shooting information based on the global features. After obtaining the global features, by analyzing the global features, the computer device may obtain the shooting information of the 2D face image sample, that is, may learn a posture of a photographer shooting the 2D face image sample, or may learn a lighting condition in which the 2D face image sample is shot, or may learn a shooting background of the 2D face image sample. In this way, the 3D face model may be projected based on the same shooting posture, the same lighting condition, or the same shooting background during projection, so that the comparability of the 2D face image obtained through projection with the inputted 2D face image sample may be improved, and an obtained similarity can be more accurate.

Specifically, the computer device may project the 3D face model in a manner of orthogonal projection or perspective projection. Other projection manner may alternatively be used. The projection manner is not limited in this embodiment of this disclosure. For example, the orthogonal projection is used, and the projection process may be as follows: The computer device rotates the face in the 3D face model according to the shooting posture in the shooting information. Then the computer device projects the 3D face model into a 2D face image through the orthogonal projection, and calculates a pixel value of each pixel in the 2D face image according to a normal vector, texture information, and an illumination model of the 3D face model. Specifically, the pixel value may be a value in a red green blue (RGB) mode. The illumination model may use a sphere harmonic illumination model, or may use a Phong reflection model. Another illumination model may alternatively be used. This is not limited in this embodiment of this disclosure.

207: The initial model in the computer device obtains a similarity between the 2D face image corresponding to the 3D face model and the 2D face image sample.

After obtaining the 2D face image through projection, the computer device may compare the 2D face image with the inputted 2D face image sample to determine whether the features of the face in the 2D face image sample may be restored in a 3D face image obtained after the initial model processes the 2D face image sample.

The computer device may compare the two face images from a plurality of angles to obtain similarities between the two face images. Specifically, attention may be paid to not only underlying information of faces, for example, shapes, expressions, and textures of the faces, but also high-level semantic information of the faces, for example, whether identities of the faces in the two images are consistent. In a possible implementation, the process of obtaining the similarity by the initial model in step 207 may be implemented in the following step 1 to step 4:

Step 1: The initial model in the computer device obtains a first similarity based on positions of a landmark of the 2D face image corresponding to the 3D face model and a corresponding landmark of the 2D face image sample.

In step 1, the initial model may pay attention to underlying information of the images. The initial model may determine whether positions of landmarks of the faces in the two images are consistent, to determine the similarity between the two images. In a possible implementation, the first similarity may be determined based on a first loss function. The initial model may obtain the first similarity based on the first loss function, the 2D face image corresponding to the 3D face model, and the 2D face image sample. For example, the first loss function may be a landmark loss function. The first loss function may alternatively be another loss function. Description is made by using only one example herein. This is not limited in this embodiment of this disclosure In a possible embodiment, the first similarity may be expressed in a manner of an L2 distance. That is, the first similarity may be an L2 loss. The L2 loss is also referred to as a mean squared error (MSE). That is, the initial model may calculate a difference between the positions of the landmarks of the two images, and calculate an expected value of a square of the difference. A smaller L2 loss indicates that a larger similarity between the positions of the landmarks of the two images, and more consistency between the landmarks of the two images. Certainly, the foregoing is only an exemplary description. The first similarity may alternatively be expressed in another manner of, for example, an L1 distance. This is not limited in this embodiment of this disclosure.

Step 2: The initial model in the computer device obtains a second similarity based on a pixel value of a pixel of the 2D face image corresponding to the 3D face model and a pixel value of a corresponding pixel of the 2D face image sample.

In step 2, the initial model may pay attention to the underlying information of the images. The initial model may determine a difference between the pixel values of the corresponding pixels in the two images. If the difference is quite large, the similarity between the two images is relatively low. If the difference is quite small, the similarity between the two images is relatively high.

In a possible implementation, the second similarity may be determined based on a second loss function. The initial model may obtain the second similarity based on the second loss function, the 2D face image corresponding to the 3D face model, and the 2D face image sample. For example, the second loss function may be a photometric loss function. The second loss function may alternatively be another loss function. Description is made by using only one example herein. This is not limited in this embodiment of this disclosure.

In a possible embodiment, the second similarity may be expressed in a manner of an L21 distance. That is, the initial model may calculate the L21 distance between pixel values of corresponding pixels of the two images. The second similarity may alternatively be expressed in another manner of, for example, an L2 distance or an L1 distance. This is not limited in this embodiment of this disclosure.

Step 3: The initial model in the computer device matches the 2D face image corresponding to the 3D face model against the 2D face image sample to obtain a third similarity degree, the third similarity being used for indicating whether an identity of a face in the 2D face image is the same as an identity of a face in the 2D face image sample.

In step 3, the initial model may pay attention to high-level semantic information of the two images. The initial model may determine whether the identities of the faces in the two images are consistent, which is used as basis of face reconstruction of the initial model. In this way, after the 3D face model is generated, a generated face is consistent with an identity of a face in an inputted 2D face image. That is, the identity of the face can be correctly recognized by performing facial recognition on either of the two images, and the face reconstruction process does not lead to failure to identify a user. The identity of the face, for example, may be a specific career associated with the person corresponding to the face image In a possible implementation, the third similarity may be determined based on a facial recognition model. That is, the third similarity may be obtained based on facial recognition performed by the facial recognition model on the 2D face image corresponding to the 3D face model and the 2D face image sample. In this implementation, the initial model may perform facial recognition on the 2D face image corresponding to the 3D face model and the 2D face image sample based on the facial recognition model, to obtain the third similarity.

Specifically, the initial model may invoke the facial recognition model, and input the 2D face image corresponding to the 3D face model and the 2D face image sample into the facial recognition model. The facial recognition model performs facial recognition on the 2D face image corresponding to the 3D face model and the 2D face image sample, and outputs the third similarity. The facial recognition model may be a trained model. The initial model may use the facial recognition model to recognize the identities of the faces in the images.

In a possible embodiment, the process of obtaining the third similarity by the facial recognition model may be implemented based on a third loss function. That is, the initial model may obtain the third similarity based on the third loss function, the 2D face image corresponding to the 3D face model, and the 2D face image sample. For example, the third loss function may be a perceptual loss function. Certainly, the third loss function may alternatively be another loss function. Description is made by using only one example herein. This is not limited in this embodiment of this disclosure.

For example, the facial recognition model may be based on a VGG-Face network. The 2D face image corresponding to the 3D face model and the 2D face image sample are inputted into the VGG-Face network. A plurality of convolutional layers in the VGG-Face network may each perform feature extraction on the 2D face image corresponding to the 3D face model and the 2D face image sample to obtain two feature vectors, so as to calculate a Euclidean distance between the two feature vectors, and use the Euclidean distance as the third similarity. The convolutional layers in the VGG-Face network perform feature extraction a plurality of times, and a PC7 layer may output the two feature vectors.

When the VGG-Face network is used as the facial recognition model, because the VGG-Face network is insensitive to illumination, the VGG-Face network may separate an illumination color from a skin color, to learn a more natural skin color and a more realistic illumination. In addition, a facial structure of the generated 3D face model may be more similar to that of the inputted 2D face image in shape through lighting and shadow changes (i.e., using various lighting and shadow) and comparison between facial recognition information. Therefore, the method provided in the present disclosure is relatively robust to 2D face images with different resolutions, different illumination conditions, and different backgrounds.

Furthermore, it is relatively easy to obtain a single picture in the foregoing method, which also makes the method more popularized. In a possible implementation, in this method, the computer device may further pre-process the 2D face image. For example, the computer device may perform face detection on the 2D face image, and may crop, when the 2D face image includes a plurality of faces, the 2D face image into a plurality of face images corresponding to the plurality of faces, to perform the foregoing operations of generating a 3D face model for each face image.

In a possible implementation, in step 1 to step 3, the initial model may obtain the first similarity, the second similarity, and the third similarity using the first loss function, the second loss function, and the third loss function respectively based on the 2D face image corresponding to the 3D face model and the 2D face image sample. Details are shown above and not described herein.

For step 1 to step 3, the computer device may not need to perform all of step 1 to step 3. According to the setting in step 4, the initial model may determine which similarity between the two images is required, and then performs a corresponding step of step 1 to step 3. In addition, step 1 to step 3 may be performed in any order. That is, step 1 to step 3 may be arranged in any order, or the computer device may perform step 1 to step 3 at the same time in parallel. The order in which step 1 to step 3 are performed is not limited in this embodiment of this disclosure.

Step 4: The initial model in the computer device obtains the similarity between the 2D face image corresponding to the 3D face model and the 2D face image sample based on the third similarity and at least one of the first similarity or the second similarity.

When the initial model obtains similarities from a plurality of angles, a plurality of similarities may be comprehensively considered to obtain the similarity between the two images. Specifically, step 4 may include three cases.

In a case 1, the initial model in the computer device obtains the similarity between the 2D face image corresponding to the 3D face model and the 2D face image sample based on the first similarity and the third similarity. Specifically, the initial model in the computer device may perform weighted summation on the first similarity and the third similarity to obtain the similarity between the 2D face image corresponding to the 3D face model and the 2D face image sample. Weights of the plurality of similarities are not limited in this embodiment of this disclosure.

In a case 2, the initial model in the computer device obtains the similarity between the 2D face image corresponding to the 3D face model and the 2D face image sample based on the second similarity and the third similarity. Specifically, the initial model in the computer device may perform weighted summation on the second similarity and the third similarity to obtain the similarity between the 2D face image corresponding to the 3D face model and the 2D face image sample. Weights of the plurality of similarities are not limited in this embodiment of this disclosure.

In a case 3, the initial model in the computer device obtains the similarity between the 2D face image corresponding to the 3D face model and the 2D face image sample based on the first similarity, the second similarity, and the third similarity. Specifically, the initial model in the computer device may perform weighted summation on the first similarity, the second similarity, and the third similarity to obtain the similarity between the 2D face image corresponding to the 3D face model and the 2D face image sample. Weights of the plurality of similarities are not limited in this embodiment of this disclosure.

In the foregoing three cases, the initial model considers both the underlying information of the images and the high-level semantic information of the images. In this way, the two images are analyzed more comprehensively and accurately, therefore the underlying information and the high-level information of the inputted 2D face image are accurately restored in the generated 3D face model with a high degree of restoration, and the 3D face model is more similar to the original inputted image and more realistic.

Only three cases are provided above. Alternatively, the initial model may consider obtaining the similarity between the two images from other perspectives. In a possible implementation, in step 203, the initial model may further reconstruct the inputted local features based on the first local feature vector after obtaining the first local feature vector, to determine whether the reconstructed local features and the local features directly extracted from the global features are consistent through comparison, to obtain a fourth similarity, and use the fourth similarity to train the local encoder to better grasp underlying local information, so that the details of the face are represented more obviously.

Specifically, the local features of the 2D face image sample may be the first local feature vector, the first local feature vector being determined based on a part of feature values extracted from the global features. The initial model may obtain a second local feature vector based on the first local feature vector, feature values of the second local feature vector being distributed the same as the part of feature values extracted from the global features. The second local feature vector is a reconstructed local feature vector. The initial model may obtain the fourth similarity based on a distance between the second local feature vector and the corresponding part of feature values extracted from the global features.

In a specific possible embodiment, the fourth similarity may be determined based on a fourth loss function. The initial model may obtain the fourth similarity based on the fourth loss function, the second local feature vector, and the corresponding part of feature values extracted from the global features. For example, the fourth loss function may be a patch reconstruction loss function. Certainly, the fourth loss function may alternatively be another loss function. This is not limited in this embodiment of this disclosure The distance between the second local feature vector and the part of feature values extracted from the global features may be an L1 distance. That is, the fourth similarity may be expressed in a manner of the L1 distance. That is, the first similarity may be an L1 loss. The L1 loss is also referred to as a mean absolute deviation (MAE). That is, the initial model may calculate an average of absolute values of deviations between the second local feature vector and the corresponding feature values. A smaller L1 loss indicates that a larger similarity between the reconstructed second local feature vector and the extracted part of feature values, and also indicates that the local encoder better grasps local information. Certainly, the foregoing is only an exemplary description. The fourth similarity may alternatively be expressed in another manner of, for example, an L2 distance. This is not limited in this embodiment of this disclosure.

Correspondingly, in step 4, the initial model may obtain the similarity between the 2D face image corresponding to the 3D face model and the 2D face image sample based on at least one of the first similarity or the second similarity, together with the third similarity and the fourth similarity. Specifically, the initial model may perform weighted summation on the at least one of the first similarity or the second similarity, together with the third similarity, and the fourth similarity, to obtain the similarity between the 2D face image corresponding to the 3D face model and the 2D face image sample. The specific implementation is not limited in this embodiment of this disclosure.

208: The computer device adjusts a model parameter of the initial model based on the similarity until a target condition is met, to obtain a face model generation model.

After the similarity between the two images is obtained, the model parameter may be adjusted based on the similarity. Step 203 to step 205 are an iterative process. After each iterative process, the computer device may perform step 206 to step 208 to adjust the model parameter of the trained initial model based on the similarity until the target condition is met, to complete the training of the face model generation model.

The target condition may be that the similarity converges, or may be that a quantity of iterations reaches a target quantity. That is, the model parameter is adjusted after each iterative process until the similarity converges after a specific iteration, or the quantity of iterations reaches the target quantity after a specific iteration, to complete the training of the face model generation model. The target condition may alternatively be another preset condition. The target condition may be preset and adjusted by related technical personnel. This is not limited in this embodiment of this disclosure.

Figure 3:
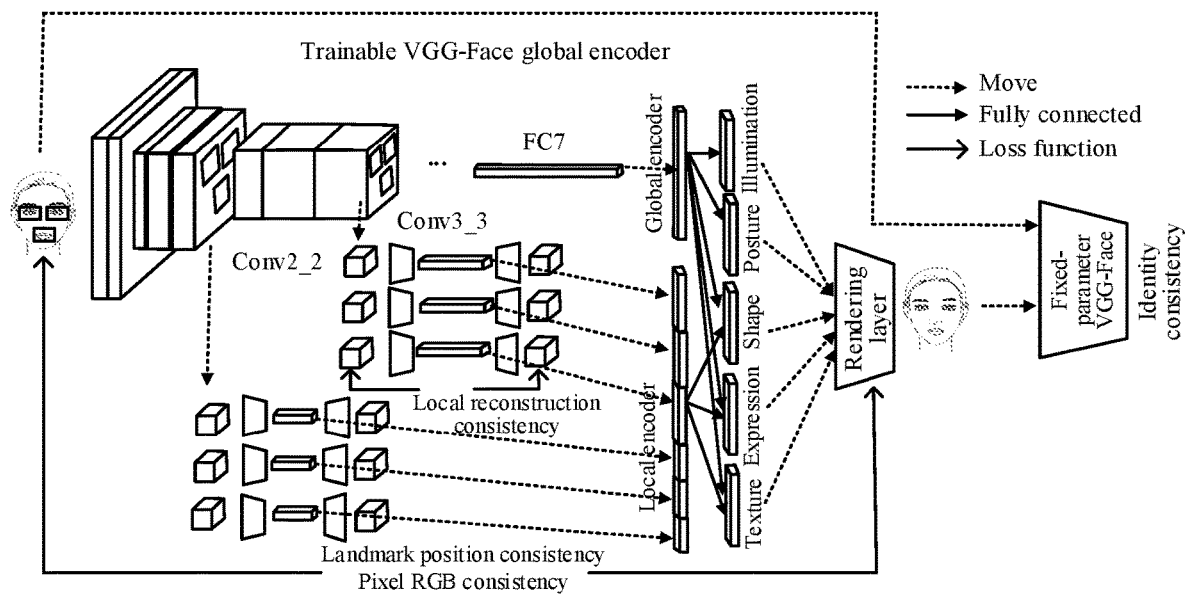
FIG. 3 is a schematic structural diagram of a face model generation model according to an embodiment of this disclosure.

The process of training the face model generation model is described below by using a specific example. Referring to FIG. 3, the face model generation model may include three modules. A first module is an encoder, which is responsible for encoding an inputted picture into a feature vector (which corresponds to step 203). A second module is a decoder, which is responsible for decoding the feature vector into 3DMM, posture, and illumination parameters (which corresponds to the process of obtaining the shooting information shown in step 204 and step 206). A third module is a facial recognition network, and is responsible for determining whether a person in the original picture and a person in a rendered picture are the same person (which corresponds to the process of obtaining the third similarity shown in step 207).

The picture is inputted into a global encoder based on a VGG-Face structure to obtain a global feature vector. Subsequently, a local encoder pays attention to features of eyes and a mouth in a conv2_2 layer and a conv3_3 layer in VGG-Face, and encodes the features into a local feature vector. Local feature vectors of different layers in different regions are connected and transmitted to the decoder together with the global feature vector. Because the posture and the illumination are global information, a fully connected layer decodes the global feature vector to obtain the posture and illumination parameters. The 3DMM parameters such as a face shape, an expression, and a texture are obtained by decoding both the global feature vector and the local feature vector. In this way, both the global information and local details can be retained. Then, a 3D face model may be reconstructed based on fitted 3DMM parameters, and then the 3D face model is rendered into a 2D picture by using the posture and illumination parameters. The rendering process is a process of shooting the 3D face model by simulating an illumination condition of the original inputted picture, a shooting angle of a camera, and intrinsic parameters. The outputted rendered 2D picture is compared with the inputted picture, and network weights of the encoder and the decoder are continuously updated by using feedback information of a comparison result.

In this embodiment of this disclosure, the initial model is trained by using the 2D face image samples to obtain the face model generation model. In the training process, the initial model extracts the global features and the local features of the 2D face image samples. The face details of the 3D face model generated by integrating the global features and the local features are represented more obviously. An effect of generating the face model generation model is better.

Furthermore, in this embodiment of this disclosure, the underlying information and the high-level semantic information of the 2D face image obtained by projecting the 3D face model may be further compared with those of the inputted 2D face image samples, to adjust the model parameter, so that both the underlying information and the high-level semantic information of the inputted original images can be restored accurately on the generated 3D face model with a high degree of restoration, and the output of the 3D face model is more realistic.

In the foregoing embodiment shown in FIG. 2, the process of training the face model generation model is described in detail. When needing to generate a 3D face model, the computer device may obtain the 3D face model by using the trained face model generation model. The process of generating the 3D face model is described below in detail in an embodiment shown in FIG. 4.

Figure 4:
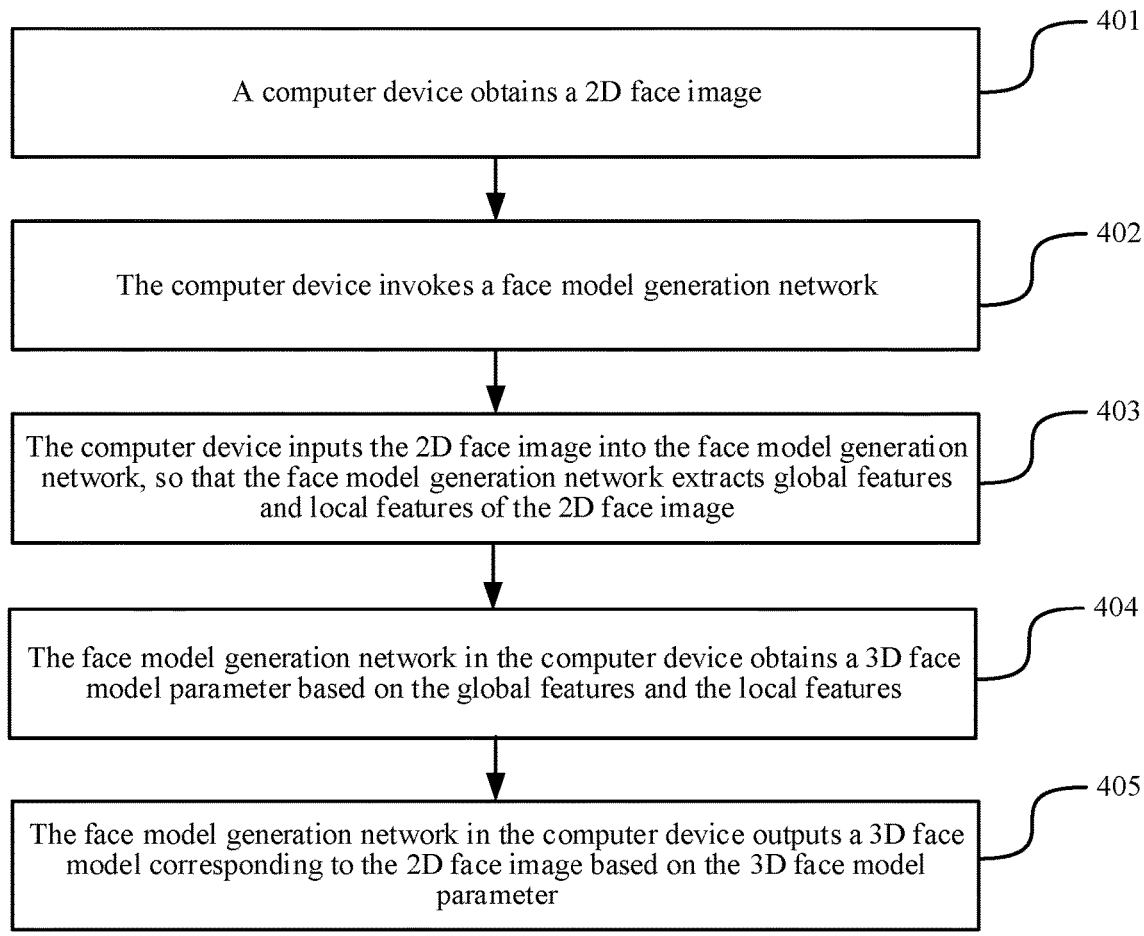
FIG. 4 is a flowchart of a computer application method for generating a 3D face model according to an embodiment of this disclosure.

FIG. 4 is a flowchart of a computer application method for generating a 3D face model according to an embodiment of this disclosure. The computer application method for generating a 3D face model is applicable to a computer device. Referring to FIG. 4, the method may include the following steps:

401: The computer device obtains a 2D face image.

The computer device may obtain the 2D face image in a plurality of manners. For example, when intending to generate a 3D face model, a user may perform image acquisition on a person based on an image acquisition function of the computer device, to obtain the 2D face image. In another example, the computer device may download the 2D face image from a target address according to a first operation instruction. In another example, the computer device may select an image from locally stored images as the 2D face image according to a second operation instruction. The specific manner used in the obtaining process may be determined based on an application scenario. This is not limited in this embodiment of this disclosure.

In a possible implementation, step 401 may alternatively be as follows: The computer device obtains a 2D face image when receiving a face model generation instruction. The face model generation instruction may be triggered by a face model generation operation. When detecting the face model generation operation, the computer device may obtain the face model generation instruction triggered by the face model generation operation, and perform step 401 according to the face model generation instruction. Certainly, the face model generation instruction may alternatively be transmitted to the computer device by another computer device. This is not limited in this embodiment of this disclosure.

402: The computer device invokes a face model generation model.

The face model generation model is configured to extract global features and local features of the 2D face image, obtain a 3D face model parameter based on the global features and the local features, and generate a 3D face model corresponding to the 2D face image based on the 3D face model parameter.

The face model generation model may be obtained through training based on the model training process shown in FIG. 2. When needing to generate a 3D face model, the computer device may invoke the trained face model generation model to generate a 3D face model.

403: The computer device inputs the 2D face image into the face model generation model, so that the face model generation model extracts global features and local features of the 2D face image.

Step 403 is similar to step 203. After the computer device inputs the 2D face image into the face model generation model, the face model generation model may process the inputted 2D face image. In the 3D face model generation operation, the face model generation model may first extract features of the 2D face image, and generate a 3D face model based on the features of the 2D face image.

Specifically, the face model generation model may obtain the global features and the local features of the 2D face image. The global features are all features obtained by performing feature extraction on the 2D face image. The local features are features obtained by performing feature extraction on local regions of the 2D face image. For example, the global features may reflect all regions of the 2D face image. The local features may reflect the local regions of the 2D face image, for example, the five sense organs of a face in the 2D face image. In another example, the local regions may be the eyes and nose, or the eyes and mouth, or certainly may be other regions. This is not limited in this embodiment of this disclosure. In the feature extraction process, both the global features and the local features are considered. In this way, the face details can be further optimized while an overall grasp of the 2D face image is achieved, so that the 3D face model obtained by integrating the global features and the local features has a better effect.

Similarly, the process of extracting the global features and the local features of the 2D face image in step 403 may be implemented in step 1 to step 3:

Step 1: The computer device may perform feature extraction on the 2D face image based on a plurality of convolutional layers, to obtain the global features of the 2D face image sample.

Step 2: The computer device obtains a central position of a landmark of the 2D face image.

Step 3: The computer device extracts, based on the central position, partial features as the local features of the 2D face image from features obtained by at least one target convolutional layer in the plurality of convolutional layers.

Content in step 1 to step 3 is similar to the content shown in step 203. In a possible implementation, the computer device snips, from a feature map obtained by each target convolutional layer, a feature map of a target size corresponding to the target convolutional layer as the local features of the 2D face image by using the central position as a center.

Similar to the content shown in step 203, the process of extracting the global features may be as follows: The face model generation model in the computer device encodes the 2D face image based on a plurality of convolutional layers of an encoder to obtain global feature vectors of the 2D face image. Correspondingly, the process of extracting the local features may be as follows: The face model generation model in the computer device extracts a part of feature values from a global feature vector obtained by at least one target convolutional layer in the plurality of convolutional layers of the encoder, and obtains a first local feature vector of the 2D face image based on the part of feature values.

Similarly, a second decoder may be provided in addition to a local encoder. The face model generation model in the computer device may extract a part of feature values in the global feature vector obtained by the at least one target convolutional layer; decode the extracted part of feature values based on the second decoder, to obtain the first local feature vector of the 2D face image.

The content shown in step 403 is similar to the content shown in step 203. The content in step 203 is not completely shown in step 403, but all may be applied to step 403. Because step 403 is similar to step 203, details are not described herein.

404: The face model generation model in the computer device obtains a 3D face model parameter based on the global features and the local features.

Step 404 is similar to step 204. The face model generation model may calculate the 3D face model parameter based on the global features and the local features. Similarly, in a possible implementation manner, the computer device may decode the global feature vector and the first local feature vector based on a first decoder, to obtain a 3D face model parameter. Details are not described in this embodiment of this disclosure.

405: The face model generation model in the computer device outputs a 3D face model corresponding to the 2D face image based on the 3D face model parameter.

Step 405 is similar to step 205. After obtaining the 3D face model parameter, the face model generation model may obtain the 3D face model through calculation based on the 3D face model parameter. That is, the face model generation model generates the 3D face model corresponding to the 2D face image based on the 3D face model parameter, and then outputs the generated 3D face model. Similarly, the generation process may be implemented in any manner as shown in step 205 and details are not described herein.

Step 403 to step 405 are a process of inputting the 2D face image into the face model generation model and outputting the 3D face model corresponding to the 2D face image. Attention is paid to both the global features and the local features in the process, so that the 3D face model is obtained by integrating the global features and the local features. Compared with a 3D face model obtained according to only global features, the face details of the 3D face model obtained in this manner are represented more obviously, and are processed more refined with a high degree of restoration, so that the 3D face model is more realistic.

In a possible implementation, in this method, the computer device may further pre-process the 2D face image. For example, the computer device may perform face detection on the 2D face image, and may crop, when the 2D face image includes a plurality of faces, the 2D face image into a plurality of face images corresponding to the plurality of faces, to perform the foregoing operations of generating the 3D face model for each face image.

In this embodiment of this disclosure, the face model generation model processes the 2D face image, to generate the 3D face model. Both the global features and the local features are extracted in the generation process, so that the 3D face model is obtained by integrating the global features and the local features. Compared with a 3D face model obtained according to only global features, the face details of the 3D face model obtained in this manner are represented more obviously, and are processed more refined with a high degree of restoration, so that the 3D face model is more realistic.

All the optional technical solutions may be combined randomly to form optional embodiments of the present disclosure. Details are not described herein.

Figure 5:
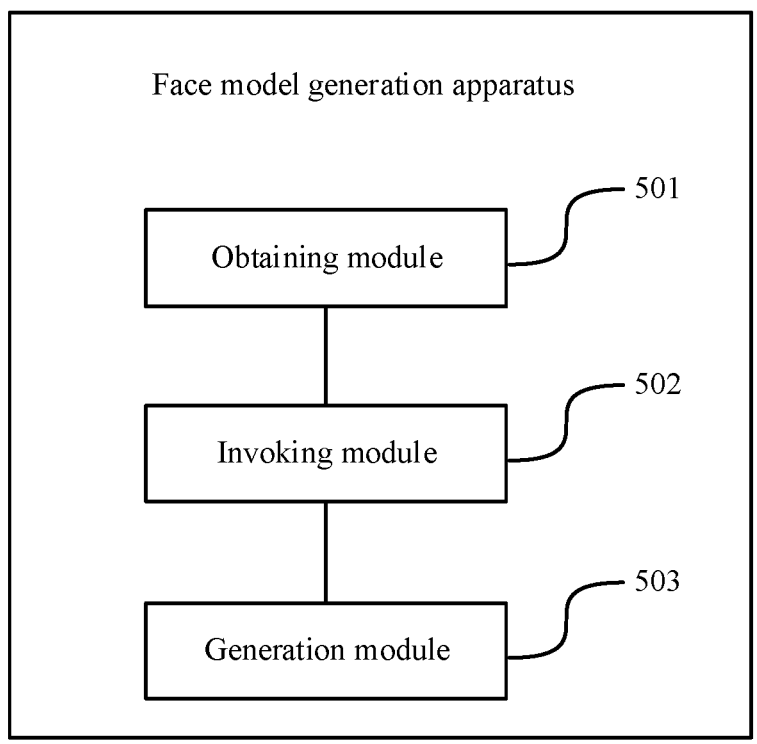
FIG. 5 is a schematic structural diagram of a computer application apparatus for generating a 3D face model according to an embodiment of this disclosure.

FIG. 5 is a schematic structural diagram of a face model generation apparatus according to an embodiment of this disclosure. Referring to FIG. 5, the apparatus may include:

an obtaining module 501, configured to obtain a 2D face image;

an invoking module 502, configured to invoke a face model generation model, the face model generation model being configured to extract global features and local features of the 2D face image, obtain a 3D face model parameter based on the global features and the local features, and generate a 3D face model corresponding to the 2D face image based on the 3D face model parameter; and a generation module 503, configured to input the 2D face image into the face model generation model, and output the 3D face model corresponding to the 2D face image.

In a possible implementation, the generation module 503 is configured to:

perform feature extraction on the 2D face image based on a plurality of convolutional layers, to obtain the global features of the 2D face image;

obtain a central position of a landmark of the 2D face image; and extract, based on the central position, partial features as the local features of the 2D face image from features obtained by at least one target convolutional layer in the plurality of convolutional layers.

In a possible implementation, the generation module 503 is configured to snip, from a feature map obtained by each target convolutional layer, a feature map of a target size corresponding to the target convolutional layer as the local features of the 2D face image by using the central position as a center.

In a possible implementation, the generation module 503 is configured to:

encode the 2D face image based on a plurality of convolutional layers of an encoder, to obtain global feature vectors of the 2D face image.

Correspondingly, the generation module 503 is further configured to extract a part of feature values from a global feature vector obtained by at least one target convolutional layer in the plurality of convolutional layers of the encoder, and obtain a first local feature vector of the 2D face image based on the part of feature values.

Correspondingly, the generation module 503 is further configured to decode the global feature vector and the first local feature vector based on a first decoder, to obtain a 3D face model parameter.

In a possible implementation, the generation module 503 is configured to extract the part of feature values in the global feature vector obtained by the at least one target convolutional layer; and decode the extracted part of feature values based on a second decoder, to obtain the first local feature vector of the 2D face image.

In a possible implementation, the obtaining module 501 is further configured to obtain a plurality of 2D face image samples.

The invoking module 502 is further configured to invoke an initial network, input the plurality of 2D face image samples into the initial network, and extract global features and local features of each 2D face image sample by using the initial network; obtain a 3D face model parameter based on the global features and the local features; and output a 3D face model corresponding to the 2D face image sample based on the 3D face model parameter.

The apparatus further includes:

a projection module, configured to project the 3D face model, to obtain a 2D face image corresponding to the 3D face model;

the obtaining module 501 being further configured to obtain a similarity between the 2D face image corresponding to the 3D face model and the 2D face image sample; and an adjustment module, configured to adjust a network parameter of the initial network based on the similarity until a target condition is met, to obtain the face model generation network.

In a possible implementation, the projection module is further configured to:

obtain shooting information of the 2D face image sample based on the global features, the shooting information being used for indicating at least one of a shooting posture, illumination, or a shooting background during shooting of the 2D face image sample; and project the 3D face model based on the shooting information, to obtain the 2D face image corresponding to the 3D face model.

In a possible implementation, the obtaining module 501 is further configured to:

obtain a first similarity based on positions of a landmark of the 2D face image corresponding to the 3D face model and a corresponding landmark of the 2D face image sample;

obtain a second similarity based on a pixel value of a pixel of the 2D face image corresponding to the 3D face model and a pixel value of a corresponding pixel of the 2D face image sample;

match the 2D face image corresponding to the 3D face model against the 2D face image sample, to obtain a third similarity, the third similarity being used for indicating whether an identity of a face in the 2D face image is the same as an identity of a face in the 2D face image sample; and obtain the similarity between the 2D face image corresponding to the 3D face model and the 2D face image sample based on the third similarity and at least one of the first similarity or the second similarity.

In a possible implementation, the obtaining module 501 is further configured to perform facial recognition on the 2D face image corresponding to the 3D face model and the 2D face image sample based on a facial recognition model, to obtain the third similarity.

In a possible implementation, the obtaining module 501 is further configured to obtain the first similarity, the second similarity, and the third similarity based on a corresponding loss function (i.e., first loss function, second loss function, and third loss function), as well as the 2D face image corresponding to the 3D face model and the 2D face image sample.

In a possible implementation, the local features of the 2D face image sample include a first local feature vector, the first local feature vector being determined based on a part of feature values extracted from the global features.

Correspondingly, the obtaining module 501 is further configured to:

obtain a second local feature vector based on the first local feature vector, feature values of the second local feature vector being distributed the same as the part of feature values extracted from the global features; and obtain a fourth similarity based on a distance between the second local feature vector and the corresponding part of feature values extracted from the global features.

Correspondingly, the obtaining module 501 is further configured to:

obtain the similarity between the 2D face image corresponding to the 3D face model and the 2D face image sample based on at least one of the first similarity or the second similarity, together with the third similarity and the fourth similarity.

In a possible implementation, the obtaining module 501 is further configured to obtain the fourth similarity based on a fourth loss function, the second local feature vector, and the corresponding part of feature values extracted from the global features.

The apparatus provided in this embodiment of this disclosure processes a 2D face image by using a face model generation network, to generate a 3D face model. Both global features and local features are obtained in the generation process, so that the 3D face model is obtained by integrating the global features and the local features. Compared with a 3D face model obtained according to only global features, the face details of the 3D face model obtained in this manner are represented more obviously, and are processed more refined with a high degree of restoration, so that the 3D face model is more realistic.

The division of the foregoing functional modules is merely described for exemplary purposes when the face model generation apparatus provided in the foregoing embodiments generates a 3D face model. In actual applications, the functions may be allocated to different functional modules according to specific requirements. That is, the internal structure of the computer device is divided into different functional modules to complete all or some of the foregoing described functions. In addition, the face model generation apparatus provided in the foregoing embodiments and the face model generation method embodiments belong to one conception. For the specific implementation process, refer to the method embodiments. Details are not described herein again.

Figure 6:
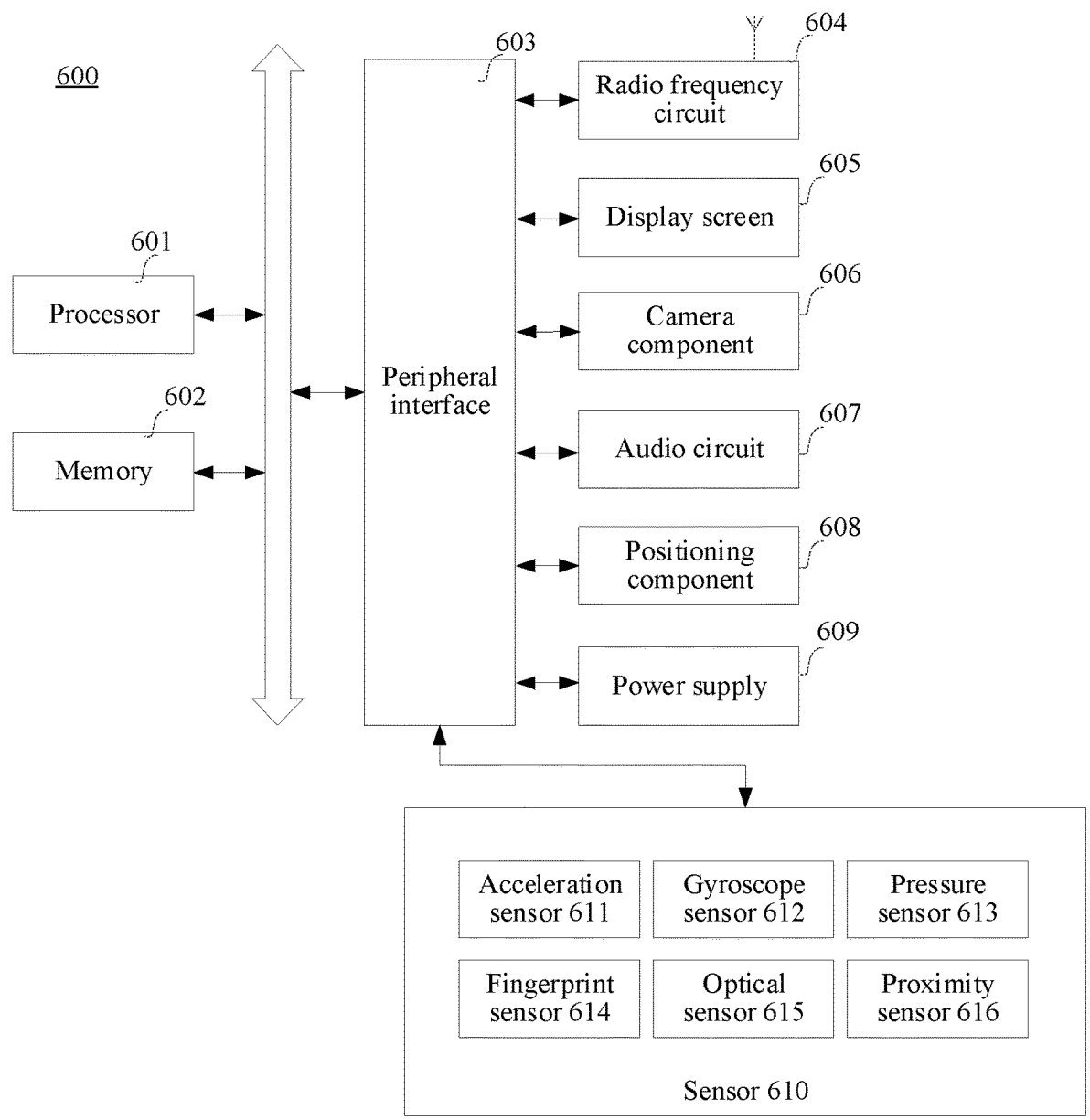
FIG. 6 is a schematic structural diagram of a terminal according to an embodiment of this disclosure.
Figure 7:
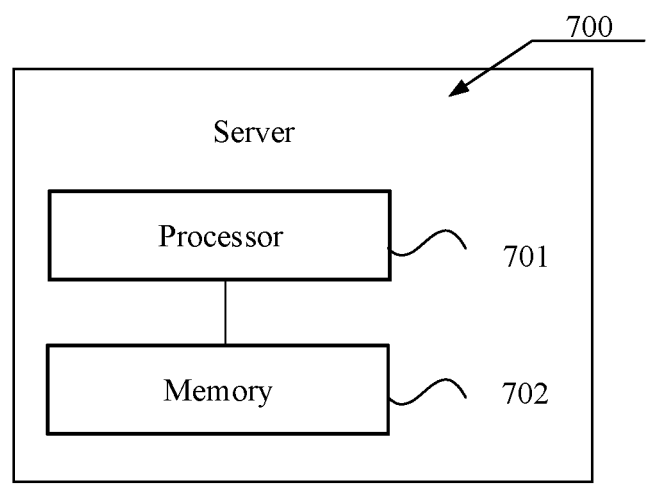
FIG. 7 is a schematic structural diagram of a server according to an embodiment of this disclosure.

The computer device may be provided as a terminal shown in FIG. 6, or may be provided as a server shown in FIG. 7. This is not limited in the embodiments of the present disclosure.

FIG. 6 is a schematic structural diagram of a terminal according to an embodiment of this disclosure. A terminal 600 may be a smartphone, a tablet computer, a moving picture experts group audio layer III (MP3) player, a moving picture experts group audio layer IV (MP4) player, a notebook computer, or a desktop computer. The terminal 600 may also be referred to as other names such as user equipment, a portable terminal, a laptop terminal, or a desktop terminal.

Generally, the terminal 600 includes a processor 601 and a memory 602.

The processor 601 may include one or more processing cores, for example, a 4-core processor or an 8-core processor. The processor 601 may be implemented in at least one hardware form of a digital signal processor (DSP), a field-programmable gate array (FPGA), and a programmable logic array (PLA). The processor 601 may alternatively include a main processor and a coprocessor. The main processor is a processor that is configured to process data in an awake state and also referred to as a central processing unit (CPU), and the coprocessor is a low-power processor configured to process data in an idle state. In some embodiments, the processor 601 may be integrated with a graphics processing unit (GPU). The GPU is configured to be responsible for rendering and drawing content to be displayed by a display screen. In some embodiments, the processor 601 may further include an artificial intelligence (AI) processor. The AI processor is configured to process a calculation operation related to machine learning.

The memory 602 may include one or more computer-readable storage media that may be non-transitory. The memory 602 may further include a high-speed random access memory (RAM) and a non-transitory memory, for example, one or more disk storage devices or flash memory devices. In some embodiments, the non-transient computer-readable storage medium in the memory 602 is configured to store at least one computer-readable instruction, and the at least one computer-readable instruction is configured to be executed by the processor 601 to implement the computer application method for generating a 3D face model or the face model generation network training method provided in the method embodiments of the present disclosure.

In some embodiments, the terminal 600 may optionally include: a peripheral interface 603 and at least one peripheral. The processor 601, the memory 602, and the peripheral interface 603 may be connected by using a bus or a signal cable. Each peripheral may be connected to the peripheral interface 603 by using a bus, a signal cable, or a circuit board. Specifically, the peripheral includes: at least one of a radio frequency (RF) circuit 604, a display screen 605, a camera component 606, an audio frequency circuit 607, a positioning component 608, and a power source 609.

The peripheral interface 603 may be configured to connect the at least one peripheral related to input/output (I/O) to the processor 601 and the memory 602. In some embodiments, the processor 601, the memory 602, and the peripheral interface 603 are integrated on the same chip or circuit board. In some other embodiments, any one or two of the processor 601, the memory 602, and the peripheral interface 603 may be implemented on a separate chip or the circuit board. This is not limited in this embodiment.

The RF circuit 604 is configured to receive and transmit an RF signal, which is also referred to as an electromagnetic signal. The RF circuit 604 communicates with a communication network and another communication device by using the electromagnetic signal. The RF circuit 604 converts an electric signal into an electromagnetic signal for transmission, or converts a received electromagnetic signal into an electric signal. Optionally, the RF circuit 604 includes: an antenna system, an RF transceiver, one or more amplifiers, a tuner, an oscillator, a digital signal processor, a codec chip set, a subscriber identity module card, and the like. The RF circuit 604 may communicate with other terminals through at least one wireless communication protocol. The wireless communication protocol includes, but is not limited to, a metropolitan area network, different generations of mobile communication networks (2G, 3G, 4G, and 5G), a wireless local area network, and/or a wireless fidelity (Wi-Fi) network. In some embodiments, the RF 604 may further include a circuit related to a near field communication (NFC), which is not limited in the present disclosure.

The display screen 605 is configured to display a user interface (UI). The UI may include a graph, text, an icon, a video, and any combination thereof. When the display screen 605 is a touch display screen, the display screen 605 also has a capability to collect a touch signal on or above a surface of the display screen 605. The touch signal may be inputted into the processor 601 as a control signal for processing. In this case, the display screen 605 may be further configured to provide a virtual button and/or a virtual keyboard, also referred to as a soft button and/or a soft keyboard. In some embodiments, there may be one display screen 605 disposed on a front panel of the terminal 600. In some other embodiments, there may be at least two display screens 605 respectively disposed on different surfaces of the terminal 600 or designed in a foldable shape. In still some other embodiments, the display screen 605 may be a flexible display screen disposed on a curved surface or a folded surface of the terminal 600. Even, the display screen 605 may further be configured to have a non-rectangular irregular graph, that is, a special-shaped screen. The display screen 605 may be manufactured by using a material such as a liquid crystal display (LCD) or an organic light-emitting diode (OLED).

The camera component 606 is configured to capture an image or a video. Optionally, the camera component 606 includes a front-facing camera and a rear-facing camera. Generally, the front-facing camera is disposed on a front panel of the terminal, and the rear-facing camera is disposed on a back surface of the terminal. In some embodiments, there are at least two rear-facing cameras, each being any one of a main camera, a depth of field camera, a wide-angle camera, and a telephoto camera, to implement a background blurring function through fusion of the main camera and the depth of field camera, panoramic photo shooting and virtual reality (VR) shooting functions through fusion of the main camera and wide-angle camera, or another fusion shooting function. In some embodiments, the camera component 606 may further include a flashlight. The flashlight may be a single-color-temperature flashlight or a dual-color-temperature flashlight. The dual-color-temperature flashlight is a combination of a warm flashlight and a cold flashlight, which may be used for light compensation at different color temperatures.

The audio circuit 607 may include a microphone and a speaker. The microphone is configured to collect sound waves of a user and an environment, and convert the sound waves into electric signals and input the electric signals into the processor 601 for processing, or input the electric signals into the RF circuit 604 to implement speech communication. For a purpose of stereo collection or noise reduction, there may be a plurality of microphones disposed at different portions of the terminal 600 respectively. The microphone may further be an array microphone or an omni-directional collection type microphone. The speaker is configured to convert electric signals from the processor 601 or the RF circuit 604 into sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 607 may further include an earphone jack.

The positioning component 608 is configured to position a current geographic location of the terminal 600 for implementing navigation or a location-based service (LBS). The positioning component 608 may be a positioning component based on the Global Positioning System (GPS) of the United States, the BeiDou system of China, the GLONASS System of Russia, or the GALILEO System of the European Union.

The power supply 609 is configured to supply power to components in the terminal 600. The power supply 609 may be an alternating current, a direct current, a primary battery, or a rechargeable battery. When the power supply 609 includes a rechargeable battery, the rechargeable battery may be a wired rechargeable battery or a wireless rechargeable battery. The rechargeable battery may be further configured to support a fast charge technology.

In some embodiments, the terminal 600 may further include one or more sensors 610. The one or more sensors 610 include, but are not limited to: an acceleration sensor 611, a gyroscope sensor 612, a pressure sensor 613, a fingerprint sensor 614, an optical sensor 615, and a proximity sensor 616.

The acceleration sensor 611 may detect a magnitude of acceleration on three coordinate axes of a coordinate system established with the terminal 600. For example, the acceleration sensor 611 may be configured to detect a component of gravity acceleration on the three coordinate axes. The processor 601 may control, according to a gravity acceleration signal collected by the acceleration sensor 611, the display screen 605 to display the user interface in a frame view or a portrait view. The acceleration sensor 611 may be further configured to collect data of a game or a user movement.

The gyroscope sensor 612 may detect a body direction and a rotation angle of the terminal 600. The gyroscope sensor 612 may cooperate with the acceleration sensor 611 to collect a 3D action by the user on the terminal 600. The processor 601 may implement the following functions according to data collected by the gyroscope sensor 612: motion sensing (for example, the UI is changed according to a tilt operation of a user), image stabilization during shooting, game control, and inertial navigation.

The pressure sensor 613 may be disposed on a side frame of the terminal 600 and/or a lower layer of the display screen 605. When the pressure sensor 613 is disposed on the side frame of the terminal 600, a holding signal of the user on the terminal 600 may be detected. The processor 601 performs left and right hand recognition or a quick operation according to the holding signal collected by the pressure sensor 613. When the pressure sensor 613 is disposed on the low layer of the display screen 605, the processor 601 controls, according to a pressure operation of the user on the display screen 605, an operable control on the UI. The operable control includes at least one of a button control, a scroll-bar control, an icon control, and a menu control.

The fingerprint sensor 614 is configured to collect a fingerprint of the user, and the processor 601 recognizes an identity of the user according to the fingerprint collected by the fingerprint sensor 614, or the fingerprint sensor 614 recognizes the identity of the user according to the collected fingerprint. In a case that the identity of the user is recognized as credible, the processor 601 authorizes the user to perform a related sensitive operation. The sensitive operation includes screen unlocking, viewing of encrypted information, software downloading, payment, setting changing, or the like. The fingerprint sensor 614 may be disposed on a front surface, a back surface, or a side surface of the terminal 600. When a physical button or a vendor logo is disposed on the terminal 600, the fingerprint 614 may be integrated with the physical button or the vendor logo.

The optical sensor 615 is configured to collect ambient light intensity. In an embodiment, the processor 601 may control display luminance of the display screen 605 according to the ambient light intensity collected by the optical sensor 615. Specifically, when the ambient light intensity is relatively high, the display luminance of the display screen 605 is increased. When the ambient light intensity is relatively low, the display luminance of the display screen 605 is reduced. In another embodiment, the processor 601 may further dynamically adjust a photographing parameter of the camera assembly 606 according to the ambient light intensity collected by the optical sensor 615.

The proximity sensor 616, also referred to as a distance sensor, is usually disposed on the front panel of the terminal 600. The proximity sensor 616 is configured to collect a distance between the user and the front surface of the terminal 600. In an embodiment, when the proximity sensor 616 detects that the distance between the user and the front surface of the terminal 600 gradually becomes smaller, the display screen 605 is controlled by the processor 601 to switch from a screen-on state to a screen-off state. In a case that the proximity sensor 616 detects that the distance between the user and the front surface of the terminal 600 gradually becomes larger, the display screen 605 is controlled by the processor 601 to switch from the screen-off state to the screen-on state.

A person skilled in the art may understand that the structure shown in FIG. 6 does not constitute a limitation to the terminal 600, and the terminal may include more components or fewer components than those shown in the figure, or some components may be combined, or a different component deployment may be used.

FIG. 7 is a schematic structural diagram of a server according to an embodiment of this disclosure. The server 700 may vary greatly due to different configurations or performance, and may include one or more CPUs 701 and one or more memories 702. The memory 702 stores at least one computer-readable instruction, the at least one computer-readable instruction being loaded and executed by the processor 701 to implement the computer application method for generating a 3D face model or the face model generation network training method provided in the foregoing method embodiments. Certainly, the server may further have a wired or wireless network interface, a keyboard, an I/O interface and other components to facilitate I/O. The server may further include other components for implementing device functions. Details are not described herein again.

In an exemplary embodiment, a computer-readable storage medium, for example, a memory including a computer-readable instruction, is further provided, and the computer-readable instruction may be executed by a processor to complete the computer application method for generating a 3D face model or the face model generation network training method in the foregoing embodiments. For example, the computer-readable storage medium may be a read-only memory (ROM), a RAM, a compact disc ROM (CD-ROM), a magnetic tape, a floppy disk, an optical data storage device, or the like.

A person of ordinary skill in the art may understand that all or some of the steps of the embodiments may be implemented by hardware or a computer-readable instruction instructing related hardware. The computer-readable instruction may be stored in a computer-readable storage medium. The storage medium may be a ROM, a magnetic disk, an optical disc, or the like.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for generating a three-dimensional (3D) face model, performed by a face model generation network running on a computer device, wherein the face model generation network comprises an encoder, the encoder comprising a convolutional neural network (CNN) with a plurality of convolutional layers, the method comprising:
    obtaining a two-dimensional (2D) face image as input to the face model generation network;
    encoding the 2D face image based on the plurality of convolutional layers of the encoder, to obtain global feature vectors of the 2D face image, the global feature vectors representing global features of the 2D face image;
    obtaining a central position of a landmark of the 2D face image;
    extracting, based on the central position, partial features as local features of the 2D face image from features obtained by at least one target convolutional layer in the plurality of convolutional layers, wherein the at least one target convolutional layer corresponds to a target size;
    obtaining a 3D face model parameter based on the global features and the local features; and
    outputting a 3D face model corresponding to the 2D face image based on the 3D face model parameter.

2. The method according to claim 1, wherein extracting, based on the central position, the partial features as the local features of the 2D face image comprises:
    snipping, from a feature map obtained by the at least one target convolutional layer, a feature map of the target size corresponding to the at least one target convolutional layer as the local features of the 2D face image by using the central position as a center.

3. The method according to claim 1, wherein:
    extracting, based on the central position, partial features as the local features of the 2D face image comprises:
        extracting a part of feature values from a global feature vector obtained by the at least one target convolutional layer, and obtaining a first local feature vector of the 2D face image based on the part of feature values; and
    obtaining the 3D face model parameter based on the global features and the local features comprises:
        decoding the global feature vector and the first local feature vector based on a first decoder, to obtain the 3D face model parameter.

4. The method according to claim 3, wherein extracting the part of feature values from the global feature vector obtained by at least one target convolutional layer in the plurality of convolutional layers of the encoder, and obtaining the first local feature vector of the 2D face image based on the part of feature values comprises:
    extracting the part of feature values in the global feature vector obtained by the at least one target convolutional layer; and
    decoding the extracted part of feature values based on a second decoder, to obtain the first local feature vector of the 2D face image.

5. A method for training a face model generation network, the face model generation network being used for generating a 3D face model based on a 2D face image, wherein the face model generation network comprises an encoder, the encoder comprising a convolutional neural network (CNN) with a plurality of convolutional layers, the method comprising:
    obtaining a plurality of 2D face image samples;
    invoking an initial network comprising a network parameter, and inputting the plurality of 2D face image samples into the initial network;
    using the initial network to perform for each 2D face image sample in the plurality of 2D face image samples:
        encoding the 2D face image sample based on the plurality of convolutional layers of the encoder, to obtain global feature vectors of the 2D face image sample, the global feature vectors representing global features of the 2D face image sample;
        obtaining a central position of a landmark of the 2D face image sample; and
        extracting, based on the central position, partial features as the local features of the 2D face image sample from features obtained by at least one target convolutional layer in the plurality of convolutional layers,
        wherein the at least one target convolutional layer corresponds to a target size;
        obtaining a 3D face model parameter based on the global features and the local features;
        outputting a 3D face model corresponding to the 2D face image sample based on the 3D face model parameter;
        projecting the 3D face model, to obtain a 2D face image corresponding to the 3D face model;
        obtaining a similarity between the 2D face image and the 2D face image sample; and
        adjusting the network parameter of the initial network based on the similarity until a target condition is met, to obtain the face model generation network.

6. The method according to claim 5, wherein extracting, based on the central position, partial features as the local features of the 2D face image sample comprises:
    snipping, from a feature map obtained by that at least one target convolutional layer, a feature map of a target size corresponding to the at least one target convolutional layer as the local features of the 2D face image sample by using the central position as a center.

7. The method according to claim 5, wherein:
extracting, based on the central position, partial features as the local features of the 2D face image sample comprises:
  extracting a part of feature values from a global feature vector obtained by the at least one target convolutional layer, and obtaining a first local feature vector of the 2D face image sample based on the part of feature values; and
obtaining the 3D face model parameter based on the global features and the local features comprises:
  decoding the global feature vector and the first local feature vector based on a first decoder, to obtain the 3D face model parameter.

8. The method according to claim 7, wherein extracting the part of feature values from the global feature vector obtained by at least one target convolutional layer in the plurality of convolutional layers of the encoder, and obtaining the first local feature vector of the 2D face image sample based on the part of feature values comprises:
  extracting the part of feature values in the global feature vector obtained by the at least one target convolutional layer; and
  decoding the extracted part of feature values based on a second decoder, to obtain the first local feature vector of the 2D face image sample.

9. The method according to claim 5, wherein projecting the 3D face model, to obtain the 2D face image corresponding to the 3D face model comprises:
  obtaining shooting information of the 2D face image sample based on the global features, the shooting information being used for indicating at least one of a shooting posture, illumination, or a shooting background during shooting of the 2D face image sample; and
  projecting the 3D face model based on the shooting information, to obtain the 2D face image corresponding to the 3D face model.

10. The method according to claim 5, wherein obtaining a similarity between the 2D face image and the 2D face image sample comprises:
  obtaining a first similarity based on positions of a landmark of the 2D face image and a corresponding landmark of the 2D face image sample;
  obtaining a second similarity based on a pixel value of a pixel of the 2D face image and a pixel value of a corresponding pixel of the 2D face image sample;
  matching the 2D face image against the 2D face image sample, to obtain a third similarity, the third similarity being used for indicating whether an identity of a face in the 2D face image is the same as an identity of a face in the 2D face image sample; and
  obtaining the similarity between the 2D face image and the 2D face image sample based on the third similarity and at least one of the first similarity or the second similarity.

11. The method according to claim 10, wherein the matching the 2D face image corresponding to the 3D face model against the 2D face image sample, to obtain a third similarity comprises:
  performing facial recognition on the 2D face image corresponding to the 3D face model and the 2D face image sample based on a facial recognition model, to obtain the third similarity.

12. The method according to claim 10, wherein a process of obtaining the first similarity, the second similarity, and the third similarity comprises:
  obtaining the first similarity, the second similarity, and the third similarity based on a first loss function, a second loss function, and a third loss function, respectively, further based on the 2D face image and the 2D face image sample.

13. The method according to claim 10, wherein:
the local features of the 2D face image sample are a first local feature vector;
the first local feature vector is determined based on a part of feature values extracted from the global features; and
the method further comprising:
  obtaining a second local feature vector based on the first local feature vector, feature values of the second local feature vector being distributed the same as the part of feature values extracted from the global features; and
  obtaining a fourth similarity based on a distance between the second local feature vector and a corresponding part of feature values extracted from the global features.

14. The method according to claim 13, wherein obtaining the similarity between the 2D face image and the 2D face image sample based on the third similarity and at least one of the first similarity and the second similarity comprises:
  obtaining the similarity between the 2D face image the 2D face image sample based on at least one of the first similarity or the second similarity, together with the third similarity and the fourth similarity.

15. The method according to claim 13, wherein obtaining the fourth similarity comprises:
  obtaining the fourth similarity based on a fourth loss function, the second local feature vector, and the corresponding part of feature values extracted from the global features.

16. A device for generating a 3D face model using a face model generation network running on the device, wherein the face model generation network comprises an encoder, the encoder comprising a convolutional neural network (CNN) with a plurality of convolutional layers, the device comprising a memory for storing computer instructions and a processor in communication with the memory, wherein, when the processor executes the computer instructions, the processor is configured to cause the device to:
  obtain a two-dimensional (2D) face image as input to the face model generation network;
  encode the 2D face image based on the plurality of convolutional layers of the encoder, to obtain global feature vectors of the 2D face image, the global feature vectors representing global features of the 2D face image;
  obtain a central position of a landmark of the 2D face image;
  extract, based on the central position, partial features as local features of the 2D face image from features obtained by at least one target convolutional layer in the plurality of convolutional layers, wherein the at least one target convolutional layer corresponds to a target size;
  obtain a 3D face model parameter based on the global features and the local features; and
  output a 3D face model corresponding to the 2D face image based on the 3D face model parameter.

17. The device according to claim 16, wherein, when the processor is configured to cause the device to extract, based on the central position, the partial features as the local features of the 2D face image, the processor is configured to cause the device to:

snip, from a feature map obtained by the at least one target convolutional layer, a feature map of the target size corresponding to the at least one target convolutional layer as the local features of the 2D face image by using the central position as a center.

\* \* \* \* \*